(12) United States Patent
Mitra et al.

(10) Patent No.: US 12,524,720 B1
(45) Date of Patent: Jan. 13, 2026

(54) RESOURCE SHARING BETWEEN VEHICLES

(71) Applicant: Amazon Technologies, Inc., Seattle, WA (US)

(72) Inventors: Indraneel Mitra, Edgewater, NJ (US); Michael Garcia, New York, NY (US); Brett Francis, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 814 days.

(21) Appl. No.: 17/810,326

(22) Filed: Jun. 30, 2022

(51) Int. Cl.
| | |
|---|---|
| *G06Q 10/0631* | (2023.01) |
| *G06Q 30/0645* | (2023.01) |
| *G06Q 50/40* | (2024.01) |
| *G08G 1/00* | (2006.01) |
| *G08G 1/09* | (2006.01) |
| *H04H 20/61* | (2008.01) |

(52) U.S. Cl.
CPC ... *G06Q 10/06315* (2013.01); *G06Q 30/0645* (2013.01); *G06Q 50/40* (2024.01); *G08G 1/091* (2013.01); *G08G 1/22* (2013.01); *H04H 20/61* (2013.01)

(58) Field of Classification Search
None
See application file for complete search history.

(56) References Cited

U.S. PATENT DOCUMENTS

| | | | |
|---|---|---|---|
| 9,003,019 B1* | 4/2015 | Guo | G06Q 30/06 709/224 |
| 9,439,121 B2 | 9/2016 | Barreto De Miranda Sargento et al. | |
| 9,756,684 B2 | 9/2017 | Tammisetti | |
| 10,419,283 B1* | 9/2019 | Fontanez | H04L 41/12 |
| 10,459,444 B1* | 10/2019 | Kentley-Klay | G07C 5/008 |
| 10,719,367 B1* | 7/2020 | Kim | G06F 9/5005 |
| 10,909,859 B1* | 2/2021 | Dodd | G08G 5/53 |
| 11,423,377 B1* | 8/2022 | Alabsi | G06Q 30/0645 |
| 2002/0165819 A1* | 11/2002 | McKnight | G06Q 20/10 705/39 |

(Continued)

OTHER PUBLICATIONS

U.S. Appl. No. 17/393,286, filed Aug. 3, 2021, Saravanakumar Shanmugam Sakthivadivel.
U.S. Appl. No. 17/810,311, filed Jun. 30, 2022, Indraneel Mitra.

*Primary Examiner* — Adam Lee
(74) *Attorney, Agent, or Firm* — Alexander A. Knapp; Kowert, Hood, Munyon, Rankin & Goetzel, P.C.

(57) ABSTRACT

A vehicle resource management system provides vehicles with vehicle agents that enable sharing of resources, via peer-to-peer connections between vehicles or other resource providers and resource consumers. For example, a first vehicle may be allocated computing capacity, storage capacity, or networking capacity of a second vehicle for use by the first vehicle over an ephemeral connection between the vehicles. The first vehicle may broadcast a request for leased resources to a plurality of potential resource providers and may select a given resource provider based on attributes of the task to be performed, policies of the vehicle, and information indicated in responses received in response to the broadcast. Upon acceptance a cryptographic handshake may be performed to establish an ephemeral connection between the vehicle and resource provider to enable sharing of resources over a direct peer-to-peer connection.

20 Claims, 11 Drawing Sheets

(56) References Cited

U.S. PATENT DOCUMENTS

| | | | |
|---|---|---|---|
| 2005/0027410 A1* | 2/2005 | Kanner | B61L 27/57 701/19 |
| 2008/0043759 A1* | 2/2008 | Poetker | H04L 12/66 370/466 |
| 2008/0189226 A1* | 8/2008 | Wurster | G06Q 30/0284 705/417 |
| 2008/0201459 A1* | 8/2008 | Vul | H04L 41/0894 709/223 |
| 2008/0256603 A1* | 10/2008 | Belgaied | H04L 63/08 726/3 |
| 2009/0006620 A1* | 1/2009 | Belgaied | H04L 63/06 709/225 |
| 2009/0059856 A1* | 3/2009 | Kermoal | H04W 16/14 370/329 |
| 2012/0277949 A1* | 11/2012 | Ghimire | G05B 23/0275 701/31.7 |
| 2012/0331113 A1* | 12/2012 | Jain | H04L 67/1008 709/220 |
| 2013/0159376 A1* | 6/2013 | Moore | H04L 67/10 709/202 |
| 2013/0212659 A1* | 8/2013 | Maher | G05D 1/0022 726/6 |
| 2013/0262556 A1* | 10/2013 | Xu | G06F 9/5027 709/202 |
| 2014/0156853 A1* | 6/2014 | Suda | G06F 9/5061 709/226 |
| 2015/0134824 A1* | 5/2015 | Mickens | G06F 9/5027 709/226 |
| 2015/0348177 A1* | 12/2015 | Craft | H04L 43/0852 705/307 |
| 2015/0372946 A1* | 12/2015 | Murthy | G06F 9/526 709/226 |
| 2016/0085654 A1* | 3/2016 | Khoury | G06F 11/3041 710/17 |
| 2016/0200166 A1* | 7/2016 | Stanek | H04W 4/44 454/75 |
| 2016/0232627 A1* | 8/2016 | Smith | G06F 16/29 |
| 2017/0132042 A1* | 5/2017 | Cherkasova | G06F 9/5077 |
| 2018/0041628 A1* | 2/2018 | Shannir | H04M 1/724631 |
| 2018/0089461 A1* | 3/2018 | Williams | G06Q 20/3829 |
| 2018/0136931 A1* | 5/2018 | Hendrich | G06F 11/30 |
| 2018/0198620 A1* | 7/2018 | Pearson | H04L 9/3247 |
| 2018/0278542 A1* | 9/2018 | Barrows | H04L 67/1036 |
| 2018/0279096 A1* | 9/2018 | Wu | H04W 72/121 |
| 2019/0004858 A1* | 1/2019 | Bernat | H04W 8/22 |
| 2019/0047434 A1* | 2/2019 | Oh | G06Q 10/0631 |
| 2019/0065275 A1* | 2/2019 | Wong | G06F 9/4843 |
| 2019/0116199 A1* | 4/2019 | Stopel | H04L 63/308 |
| 2019/0139330 A1* | 5/2019 | Lin | G06Q 10/02 |
| 2020/0080853 A1* | 3/2020 | Tam | G08G 1/22 |
| 2020/0099739 A1* | 3/2020 | Boehm | G06F 9/5044 |
| 2020/0100078 A1* | 3/2020 | Boehm | H04L 67/30 |
| 2020/0162463 A1* | 5/2020 | Dykstra | H04L 63/10 |
| 2020/0183726 A1* | 6/2020 | Heindl | G06F 9/45558 |
| 2020/0186592 A1* | 6/2020 | Bernat | H04L 67/10 |
| 2020/0287960 A1* | 9/2020 | Higuchi | H04L 67/1001 |
| 2020/0313959 A1* | 10/2020 | Higuchi | H04L 67/12 |
| 2020/0349776 A1* | 11/2020 | Yeung | G07C 5/008 |
| 2020/0380595 A1* | 12/2020 | Huber | G08G 1/091 |
| 2021/0082220 A1* | 3/2021 | Boerger | G07C 9/10 |
| 2021/0119793 A1* | 4/2021 | Gaddam | H04L 9/0861 |
| 2021/0136078 A1* | 5/2021 | Barhudarian | H04L 9/3213 |
| 2021/0168805 A1* | 6/2021 | Koh | H04W 76/14 |
| 2021/0182997 A1* | 6/2021 | Klingemann | G06Q 10/06315 |
| 2021/0209680 A1* | 7/2021 | Adil | G06Q 40/03 |
| 2021/0218692 A1* | 7/2021 | Higuchi | H04L 67/12 |
| 2021/0286654 A1* | 9/2021 | Liu | G06F 9/52 |
| 2021/0326185 A1* | 10/2021 | Opsenica | G06F 9/5072 |
| 2022/0156115 A1* | 5/2022 | Zeng | G06F 9/505 |
| 2022/0179411 A1* | 6/2022 | Joly | G05D 1/0212 |
| 2022/0250636 A1* | 8/2022 | Ucar | H04L 67/12 |
| 2022/0284025 A1* | 9/2022 | Adams | G06F 17/18 |
| 2022/0289067 A1* | 9/2022 | Adegbohun | H01M 10/6554 |
| 2022/0337417 A1* | 10/2022 | Sanders | H04L 67/34 |
| 2022/0353350 A1* | 11/2022 | Kim | G06Q 30/06 |
| 2022/0386094 A1* | 12/2022 | Vemuri | H04W 4/70 |
| 2022/0391634 A1* | 12/2022 | Wang | G06V 20/56 |
| 2023/0239299 A1* | 7/2023 | Archarya | H04L 63/10 726/4 |
| 2023/0344863 A1* | 10/2023 | Shashivasan | H04L 63/1425 |
| 2023/0379365 A1* | 11/2023 | Szigeti | H04L 63/1425 |
| 2023/0410100 A1* | 12/2023 | Diamond | B60L 58/13 |
| 2024/0152380 A1* | 5/2024 | Stinson | G06F 9/54 |
| 2024/0171657 A1* | 5/2024 | Sharma Banjade | H04L 67/61 |
| 2025/0016573 A1* | 1/2025 | Fukui | H04W 28/0846 |

\* cited by examiner

RESOURCE SHARING BETWEEN VEHICLES

BACKGROUND

Modern vehicles, such as cars, trucks, motorcycles, etc. may include many different software applications that perform various functions for the vehicle. Modern vehicles also include computing and storage resources that may be used to perform tasks for such software applications. Additionally, modern vehicles often include antennas that provide connectivity with remote entities. For example, a vehicle may be equipped with a cellular antenna (e.g., 4G, 5G, etc.), a wide-area network (WAN) and/or short-range communications antenna, and/or a Wi-Fi antenna.

At a given moment in time, it is not unusual for resources of a vehicle, such as computing capacity, storage capacity, etc. to not be fully utilized by the vehicle to perform tasks. For example, a vehicle may be designed with sufficient computing capacity, storage capacity, networking capacity, etc. to provide sufficient capability to perform tasks in various circumstances, but such capacity may remain unutilized in other circumstances, such as during normal operation, or when the vehicle is parked.

Figure 1:
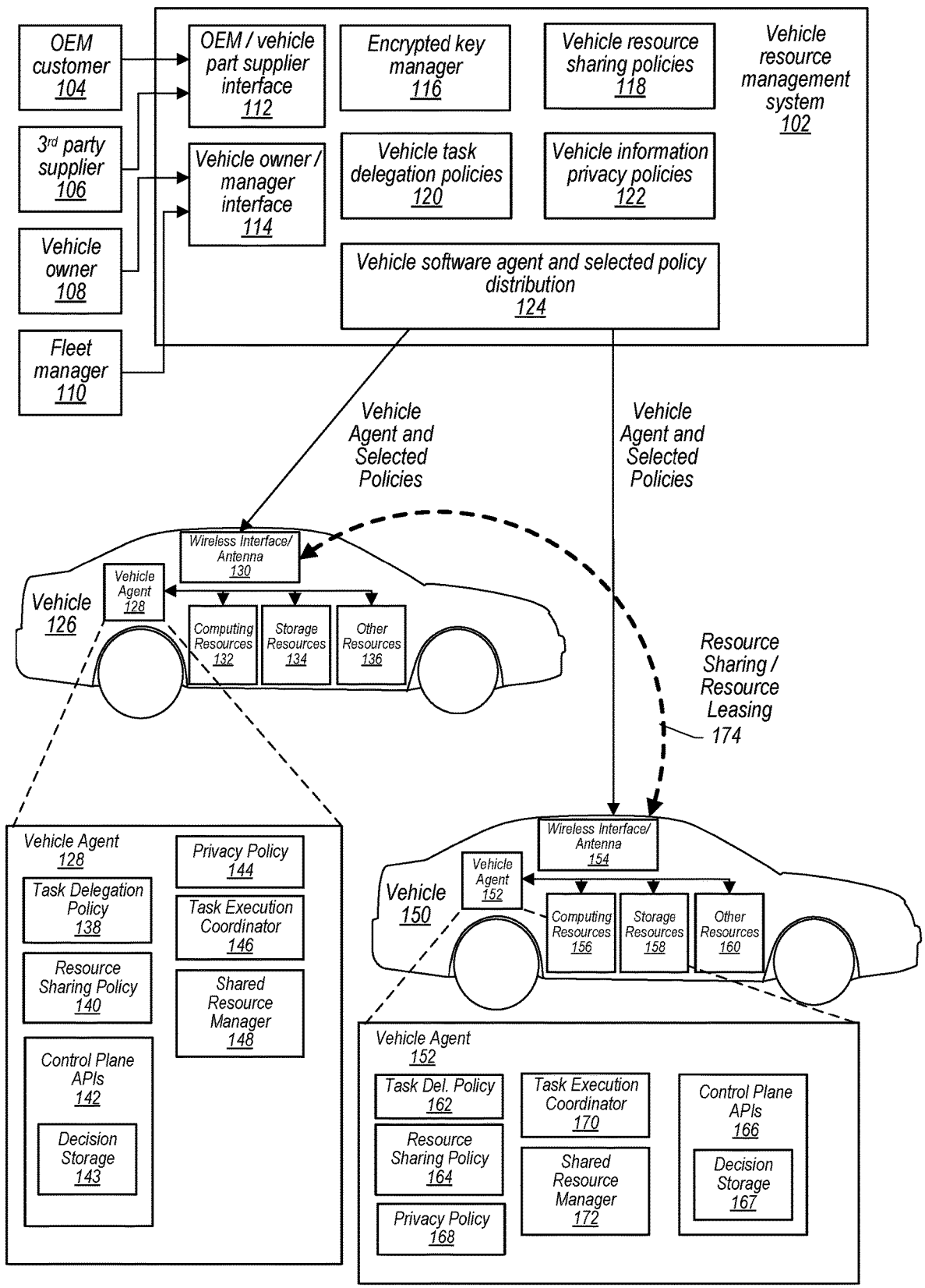
FIG. 1 is a logical block diagram illustrating a vehicle resource management system that provides vehicles with in-vehicle agents that enable sharing of resources directly between respective ones of the vehicles and a resource provider, such as another vehicle, roadside resource, external electronic device, etc., according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement resource sharing between vehicles and/or other resources in communication with vehicles, such as roadside resources, external electronic devices carried by passengers of the vehicle, etc. In some embodiments, a vehicle agent is provided to a vehicle by a cloud-based service, such as a vehicle resource management system, wherein the vehicle agent executes in a runtime environment of the vehicle. The vehicle agent may implement one or more application programmatic interfaces (APIs) that form a distributed control plane between other entities with similar APIs, such as other vehicles, roadside resources, external electronic devices carried by passengers of the vehicle, etc.

For example, a vehicle agent API may cause a request for leased resources to be broadcast via an antenna of a first vehicle to a plurality of recipients, such as other vehicles, a roadside resource, an external electronic device in the vehicle, etc. These recipients may in turn evaluate the request for leased resources and determine a response based on various factors, such as an availability of surplus resource capacity at the recipient, recipient conditions (e.g., battery charge status, anticipated time before next battery charging opportunity, etc.), a resource sharing policy of the recipient (e.g., resources are only to be shared with other members of a same fleet, resources are only to be shared with vehicles manufactured by a particular original equipment manufacturer (OEM), or resources are to be shared with third parties according to negotiated lease terms, as a few examples of resource sharing policies). If a determination is made at the recipient devices to offer resources for lease, the recipient devices, may provide, via a control plane API of the recipient devices, a response back to the requesting vehicle indicating various characteristics of the resources available for lease and conditions for the lease, such as: resource types available for lease, costs of the resources available for lease, a time window within which the resources will be available for use as part of the lease, a location of the recipient device that will be providing the resources, if the recipient device is a mobile device (such as a vehicle), a direction and/or speed of travel of the mobile device including the resources to be leased, etc. In some embodiments, the response may further indicate one or more entities associated with the recipient that have determined to make resources available for lease, such as an owner of the resources, an OEM affiliated with the resources, etc. In some embodiments, the response may further indicate a geofence in which the resources to be leased are located. If the resource requestor or the resource provider are a member of a fleet, the response may indicate a fleet ID. Also, in some embodiments, vehicles travelling in a same direction and a comparable speed may communicate among themselves to organize the vehicles into a platoon and a response may include a platoon ID. In some embodiments, the broadcast and subsequent responses are communicated between the resource requesting vehicle and the resource providers via direct peer-to-peer communications, such as 5G, 4G, Wi-Fi, dedicated short-range communication (DSRC), PC5, etc.

The vehicle agent of the vehicle issuing the broadcast may evaluate responses received from the various potential resource providers and may select a given resource provider based on the various characteristics and conditions indicated in the respective responses along with a task delegation policy of the vehicle. In some embodiments, a task delegation policy of a vehicle may define entities to which a task may be delegated (e.g., as work to be performed on leased resources), resource types that may be used to perform a delegated task, security conditions that must be fulfilled in order to authorize delegation of a task to leased resources, etc. Also, a task execution coordinator of the vehicle issuing the broadcast (e.g., the vehicle seeking leased resources) may further define other considerations to be used in selecting a leased resource provider, such as a time window during which the leased resources will be available, a length of time the leased resources will be available, etc. In some embodiments, a privacy policy of the vehicle issuing the broadcast (e.g., the vehicle seeking leased resources) may further stipulate that the leased resources are to be provided in a containerized execution environment, or as virtualized resources managed by a resource manager of the entity providing the leased resources. In some embodiments, the privacy policy may further stipulate that the vehicle is to have exclusive use of the leased resources (e.g., the leased resources are not permitted to be leased to other vehicles concurrently with the vehicle seeking the leased resources, etc.). In some embodiments, other factors that may be considered include distances between the resource requesting vehicle and the resource providers, radio interference between the resource requesting vehicle and the resource providers, latency, costs, etc. Based on these and other potential considerations, the vehicle agent of the vehicle seeking leased resources may select a given resource provider to lease resources from.

In some embodiments, another control plane API of the vehicle agent may initiate a secure vehicle-to-vehicle, vehicle-to-roadside resource, vehicle-to-electronic device, etc. connection be formed between the resource requesting vehicle and the resource providing entity (e.g., vehicle, roadside resource, external electronic device, etc.). For example, a remote procedure call agent on the vehicle requesting resources may perform a cryptographic handshake with the selected resource provider in order to establish an ephemeral connection to the leased resources of the resource provider. Furthermore, an API of the vehicle agent may instruct a shared resource manager of the vehicle agent to spool one or more tasks or task portions to the leased resources for execution. Results may be provided back to the shared resource manager and/or used by the task execution coordinator to execute the task or to proceed to a next task in a workflow that is to be executed. In some embodiments, a resource spooling service running on the vehicle requesting resources, the resource provider, or a roadside resource in a geofence with the resource requesting vehicle and the resource provider, may allocate resources of the resource provider and enable connections to be formed between the resource requesting vehicle and the allocated resources. Once the resources are allocated and a connection is established, remote execution calls may be issued, for example by a task execution coordinator of the vehicle seeking leased resources, to cause tasks to be executed, on behalf of the vehicle, on the leased resources of the resource provider. At the end of a lease period, the connection may be terminated and the previously leased resources may be reclaimed by the resource provider.

In some embodiments, a road side resource may include mobile edge computing (MEC) infrastructure and/or road side units (RSUs). The road side resources may be configured to establish wireless connections with vehicles within a geofence range of the respective road side resource. Additionally, the roadside resources may be configured to establish wireless connections with any wireless accessible device, or solely the vehicles. In some embodiments, roadside resources may use various wireless communication protocols or technologies, such as 5G, 4G, Wi-Fi, dedicated short-range communication (DSRC), PC5, wide area networks (e.g., LoRaWAN, SigFox), etc. In a similar manner, vehicles may use such various wireless communication protocols or technologies to communicate with a roadside resource or with another vehicle via direct vehicle-to-vehicle communications.

In some embodiments, a vehicle agent provided to a vehicle from a cloud-based computing device, for example of a vehicle resource management system, may enable on-demand sharing of un-utilized resources, such as computing resources, storage resources, networking resources, etc., across mobile and/or static edge entities, such as other vehicles or roadside resources (e.g., mobile edge compute, road side units, etc.) that reside in a same geofence. These shared resources may be used to execute ephemeral workloads that are resource intensive and that may exceed the capacities of respective vehicles to execute on their own.

As an illustrative example of resource sharing between vehicles as described herein, consider a first vehicle parked in a parking facility with other vehicles. The first vehicle may be performing a task that is compute intensive and/or storage intensive, such as decompressing image files collected while driving and using the decompressed images to update a machine learning model used by the vehicle. The first vehicle may estimate an amount of time that is required to perform the machine learning model update, an amount of storage that will be needed to store the decompressed image files, and an amount of computing power that will be needed to perform calculations to update the machine learning model. The first vehicle may send out broadcast(s) to the other vehicles at the parking facility to locate available resources for lease that meet the storage and computing requirements needed to perform the machine learning model update. The first vehicle may also indicate in the request an amount of time the computing and storage resources will need to be made available to perform the machine learning model update. In some embodiments, the image files may include personally identifiable information or other confidential information. In such embodiments, a privacy policy of the first vehicle may put limitations on which other vehicles can participate in resource sharing. For example, if the first vehicle is manufactured by a particular OEM, the privacy policy may only allow sharing of data with other vehicles manufactured by the same particular OEM. In some embodiments, the tasks of the machine learning model update job may be segregated, wherein certain tasks that involve data including PII or other confidential information are performed locally at the first vehicle or only on a select sub-set of leased resources having higher security credentials, while other tasks that do not involve PII or confidential information are performed on leased resources more generally.

As another illustrative example of resource sharing between vehicles as described herein, a set of vehicles may be organized into a fleet managed by a fleet owner. The fleet owner may be able to define the members of the fleet via an interface to a vehicle resource management system, wherein the vehicle resource management system provides a vehicle agent and associated policies to the vehicles of the fleet to enable resource sharing between the vehicles of the fleet. For example, a vehicle resource sharing policy provided to the vehicles from the vehicle resource management system may define the fleet membership and may apply restrictions on sharing resources with vehicles that are not fleet members. In some embodiments, the vehicle owner may save on computing costs by enabling the members of the fleet to share resources. For example, consider a similar scenario as described above wherein a vehicle is to decompress image files collected while driving and use the decompressed images to update a machine learning model used by the vehicle. Each individual vehicle of the fleet may lack sufficient computing and/or storage resources to perform this task when performed alone, but the vehicles of the fleet collectively may have more than sufficient resources to perform the task. Thus, each vehicle of the fleet may take turns performing the task, while leveraging resources of the other fleet members to execute the compute intensive, storage intensive, and/or networking intensive aspects of the task.

In some embodiments, vehicles that are not members of a common fleet, e.g., where the vehicles are third parties to one another but are also customers of a common vehicle resource management system that provides the respective vehicles with vehicle agents and associated policies, may participate in resource sharing. In some embodiments, a common vehicle resource management system may manage credits exchanged between participants to encourage sharing of resources. Also, in some embodiments, vehicles may negotiate sharing terms, such as costs, etc. between themselves or with the vehicle resource management system, and the vehicle resource management system may coordinate tracking and distribution of credits/proceeds from the vehicle resource sharing.

As yet another illustrative example, a similar scenario as described above with regard to vehicles parked at a parking facility may take place for vehicles in motion. For example, vehicles in motion may have received a vehicle agent from a common vehicle resource management system and/or include compatible vehicle agents. The vehicles may issue a broadcast to identify other vehicles that are travelling in a same direction and/or speed. Based on responses to the broadcast, the vehicles may identify a platoon of vehicles traveling together. In such embodiments, a similar process as described above for the vehicles of the parking facility may be used to share resources amongst the members of the platoon. In some embodiments, the vehicles may further utilize navigation routes to estimate an amount of time the respective vehicles may remain in the platoon and include this information in a response to a request for resources.

In some embodiments, vehicles that are sharing resources may provide one or more early warnings regarding potential revocation of access to the resources. For example, a member of a platoon may determine that a navigation route of the vehicle has been changed and may send an early notification that the vehicle may be leaving the platoon. As another example, a vehicle in a parking facility may determine that its doors have been unlocked and send an early notice that it may be leaving the parking facility and therefore no longer be available to share resources with another vehicle parked in the parking facility. In such situations, a vehicle using the shared resources may proactively seek replacement shared resources from other vehicles (such as other vehicles parked at the parking facility or other members of the platoon) in response to the early revocation notice. In some embodiments, additional revocation notices may be issued in response to different events indicating a more imminent revocation of access to the leased resources.

As yet another illustrative example, in some embodiments, networking sharing may be used as a leased resource. For example, a vehicle may determine that a mobile device of an occupant of the vehicle, such as a mobile phone, is a better or additional networking option that may be used (e.g., the mobile device may have a lower cost network connection, a higher bandwidth network connection, or additional capacity that is needed to augment capacity of the vehicle's network connection). In such embodiments, the vehicle agent may lease networking capacity from the passenger's electronic device in order to perform one or more networking related tasks. In some embodiments, networking resources of other vehicles may be used to delegate networking tasks from a first vehicle to the other vehicles, wherein the vehicles may use parallel network connections to more quickly perform a network task, as another example.

FIG. 1 is a logical block diagram illustrating a vehicle resource management system that provides vehicles with in-vehicle agents that enable sharing of resources directly between respective ones of the vehicles and a resource provider, such as another vehicle, roadside resource, external electronic device, etc., according to some embodiments.

In some embodiments, a vehicle resource management system, such as vehicle resource management system 102, includes an OEM/vehicle part supplier interface 112 and a vehicle/owner/manager interface 114. In some embodiments, vehicle OEMs, part suppliers, owners, and/or managers, may utilize interfaces 112 and 114 to define policies to be used with regard to sharing resources. For example, an OEM customer 104 may define a vehicle sharing policy that indicates resources of vehicles manufactured by the OEM are only to be leased to other vehicles also manufactured by the OEM. Alternatively, the OEM customer may enable third-party suppliers to manage policies for resources supplied by the third-party parts suppliers, and a third-party supplier 106 may utilize interface 112 to define policies to be used for sharing resources supplied by the third-party supplier. In a similar manner, the OEM customer 104 and/or the third-party supplier 106 may utilize interface 112 to define policies for how data may be restricted from being used at external resource providers when performing delegated tasks. For example, an OEM customer 104 may define a policy that restricts certain types of data from being shared with certain types of resource providers. In some embodiments, such policies defined by customers of the vehicle resource management system 102, such as OEM customer 104 and third-party supplier customer 106, may be stored as vehicle resource sharing policies 118, vehicle task delegation policies 120, and/or vehicle information privacy policies 122.

In some embodiments, a vehicle resource management system, such as vehicle resource management system 102, also includes an encrypted key manager 116. The encrypted key manager 116 may provide vehicles or other entities (e.g., roadside resources) with encryption signatures to be used in broadcast messages and/or responses to identify and authenticate the respective participants.

In some embodiments, a vehicle resource management system, such as vehicle resource management system 102, includes a vehicle software agent and selected policy distribution module 124. The distribution module 124 may distribute vehicle agents to customer vehicles, such as vehicles 126 and 150 along with selected policies that are to be used by those vehicles, such as a vehicle resource sharing policy, a vehicle task delegation policy, a vehicle information privacy policy, etc. In some embodiments, the policies may have been provided by customers 104, 106, 108, and/or 110, or may have been selected by the customer from existing policies already stored in the vehicle resource management system 102.

For example, vehicle 126 is provided vehicle agent 128 that includes task delegation policy 138, resource sharing policy 140, and privacy policy 144. Also, vehicle 150 is provided vehicle agent 152 that includes task delegation policy 162, resource sharing policy 164, and privacy policy 168. In some embodiments, the respective policies of vehicle 126 may be different from those of vehicle 150. Also, the policies may overlap or be the same, based on selections made by customers 104, 106, 108, and/or 110.

The respective vehicles 126 and 150 include compute resources, storage resources and/or other resources that may be used to perform local tasks and that may be leased to other entities as leased resources. For example, vehicle 126 includes computing resources 132, storage resource 134, and other resource 136. Additionally, vehicle 126 includes wireless interface/antenna 130 that provides networking resources. While not shown, in some embodiments a vehicle may also include a wired interface, for example that may be used to connect an electronic device of a passenger to the vehicle, such as a mobile phone connected via a wired connection. In some embodiments, other resources 136 may include software resources. For example, a vehicle may have a particular software application that may be leased to perform tasks for other vehicles that do not have the software application. Also, other resources 136 may include hardware resources such as specially designed hardware and/or task acceleration devices, such as GPUs, ASICs, FPGAs, etc. In a similar manner, vehicle 150 includes computing resources 156, storage resources 158, and other resources 160, which may be similar and/or different resources than those of vehicle 126.

In some embodiments, vehicle agent 128 additionally includes control plane APIs 142 that are used to issue requests for resources and respond to requests for resources, as well as initiate an ephemeral connection between vehicle 126 and leased resources of a resource provider, such as resources of vehicle 150. Also, control plane APIs 142 may initiate/or accept an ephemeral connection to enable resources of vehicle 126 to be leased to a resource consumer, such as vehicle 150. Vehicle 150 includes similar control plane APIs 166.

In some embodiments, a shared resource manager 148 or 172 may allocate resources of a resource provider to a resource consumer via an ephemeral connection established via control plane APIs 142 and/or 166. Also, a task execution coordinator 146 or 170 may delegate tasks or portions of tasks from a resource consuming vehicle runtime environment to a resource provider. For example, task execution coordinator 146 may delegate a task, or portion of a task, from vehicle 126 to be performed using one or more of computing resources 156, storage resources 158, other resources 160, and/or wireless interface/antenna (e.g., networking resources) of vehicle 150. For example, resource sharing/leasing is enabled between vehicle 126 and 150 via connection 174. In some embodiments, vehicle agents and/or the control plane implemented using APIs of the vehicle agents includes a storage to store responses received in response to a broadcast message and/or to store data used to establish the ephemeral connection. For example, control plane APIs 142 may access decision storage 143 and control plane APIs 166 may access decision storage 167.

Figure 2:
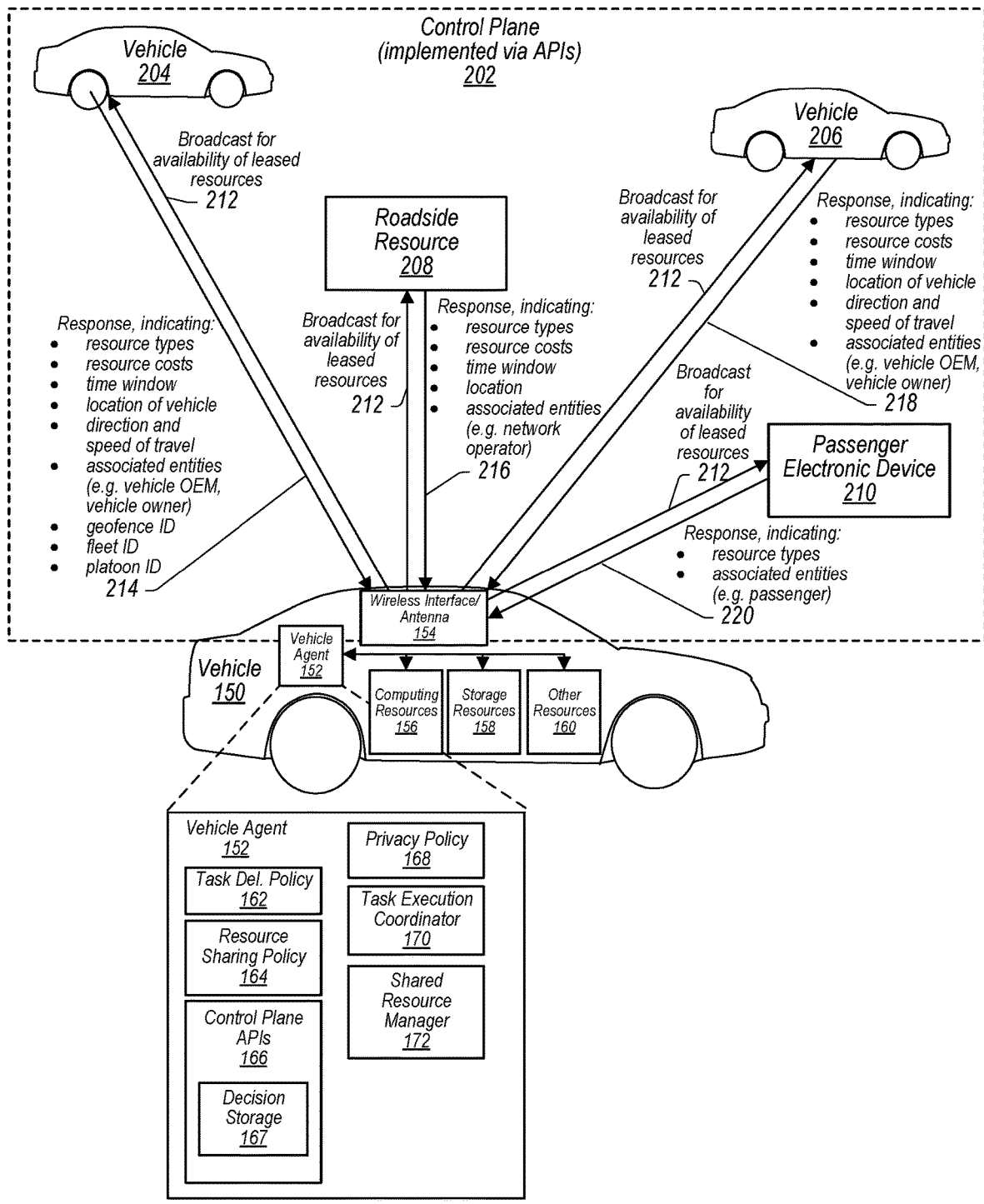
FIG. 2 is a logical block diagram illustrating a distributed control plane implemented via application programmatic interfaces (APIs) of respective vehicles, a roadside resource, and/or other electronic devices, wherein the distributed control plane negotiates sharing of resources between the vehicles, roadside resource, and/or other electronic devices, according to some embodiments.

FIG. 2 is a logical block diagram illustrating a distributed control plane implemented via application programmatic interfaces (APIs) of respective vehicles, a roadside resource, and/or other electronic devices, wherein the distributed control plane negotiates sharing of resources between the vehicles, roadside resource, and/or other electronic devices, according to some embodiments.

In some embodiments, a broadcast request for information about the availability of leased resources at other entities may be sent to a plurality of types of entities and respective responses may indicate various characteristics of the available resources and/or the entities able to provide the resources. For example, vehicle 150 may issue broadcast request 212 to vehicle 204, vehicle 206, roadside resource 208, and/or passenger electronic device 210. The respective potential resource providers may respond to the broadcast request 212 with individualized respective responses 214, 216, 218, and 220. For example, vehicle 204 may indicate a type of resources of the vehicle 204 that are available for lease, a cost to be paid for leasing the resources (or credits to be consumed, etc.), a time window during which the resources will be available to be leased and perform work for vehicle 150, a current location of vehicle 204, a state of vehicle 204 (e.g., parked or driving), if driving, a direction and/or speed of travel of vehicle 204, entities associated with vehicle 204 (such as an OEM of vehicle 204 or an owner/manager/operator of vehicle 204), a geofence ID for a geofence in which vehicle 204 is located, a platoon ID of a platoon of which vehicle 204 is a member, etc.

In some embodiments, response 216 from roadside resource 208 may indicate types of available resources of roadside resource 208 that may be leased, costs for leasing the resources, a time window when the resources will be available, etc. The response 216 may also indicate a location of the roadside resource 208, and an entity associated with the roadside resource 208, such as a network operator.

In some embodiments, vehicle agent 152 may further determine a time window for using roadside resource 208 based on whether vehicle 150 is parked or in motion. Also, if in motion, vehicle agent 152 may determine if vehicle 150 is driving towards roadside resource 208 or away from roadside resource 208. Additionally, a speed at which vehicle 150 is travelling (or accelerating) may be used to estimate an amount of time until vehicle 150 travels outside of a radio range of roadside resource 208. In some embodiments, these and/or various other considerations may be used by shared resource manager 172 and/or other components of vehicle agent 152 to determine whether or not to lease resources from roadside resource 208.

Similar information as described for response 214 may be provided in response 218 from vehicle 206. However, the information in response 218 may be specific to vehicle 206, wherein vehicle 206 may have different available resources, that are available at a different time window (or for a different duration). Vehicle 206 may require higher or lower costs for leasing resources of vehicle 206 as compared to vehicle 204. Also, vehicle 206 may be in a different location, or in a different state (e.g., parked vs. driving). If driving, vehicle 206 may be driving in a same direction and speed as vehicle 150, wherein vehicle 204 is not driving the in the same direction or at the same speed. Thus, vehicle 150 may select vehicle 206 to lease resources from over vehicle 204, as an example, based on driving direction and/or speed. Also, vehicle 206 may be associated with different entities, such as a different OEM and/or manager/owner.

As another example, response 220 from passenger electronic device 210 may indicate a type of available resources to be leased as well as an associated entity, such as a manufacturer of passenger electronic device 210 and/or an owner of passenger electronic device 210.

In some embodiments, vehicle agent 152 may store the information included with the responses 214, 216, 218, and 220 in decision storage 167, and may evaluate the different characteristics described in the response information to select a resource provider to lease resources from. In some embodiments, the results of this decision may additionally be stored in decision storage 167. Vehicle agent 152, via control plane APIs 166, along with APIs of the resource providers (e.g., vehicle 204, vehicle 206, roadside resource 208, and passenger electronic device 210) implement control plane 202 that enables the negotiation of leases via broadcast 212 and responses 214, 216, 218, and 220. Once a given resource provider is selected, vehicle agent 152 may use one or more other ones of control plane APIs 166 to initiate a connection to the selected resource provider. Also, a shared resource manager of the given selected resource provider may allocate resources for use by vehicle 150 and task execution coordinator 170 and/or shared resource manager 172 of vehicle agent 152 may delegate one or more tasks (or task portions) to be performed using resources of the selected resource provider. The results of the task may be provided back to vehicle 150, for example via the established connection. Also, in some embodiments, results may be forwarded on to another entity such as a cloud-based service, or other recipient.

Figure 3:
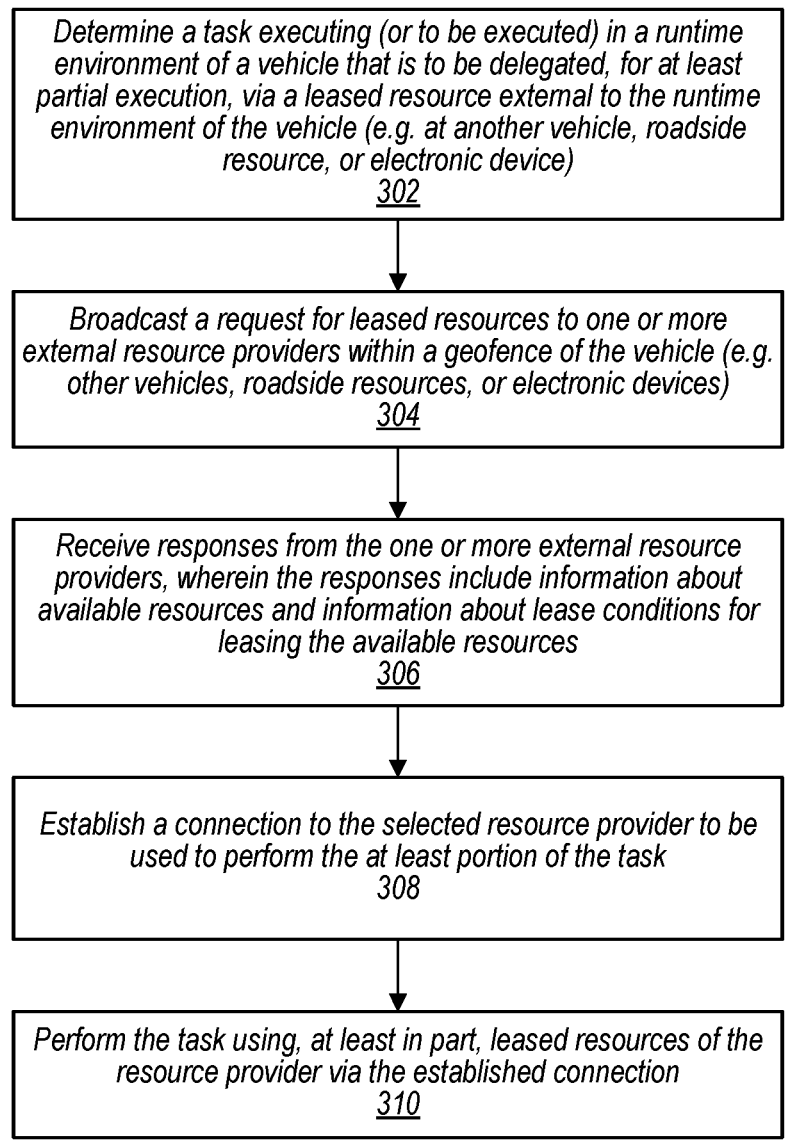
FIG. 3 is a process flow diagram illustrating steps performed by a vehicle to request use of resources of other vehicles, roadside resources, or other electronic devices to perform at least a portion of a task for the vehicle, wherein the vehicle selects a given external resource to perform the at least portion of the task, and the vehicle establishes a wireless connection with the selected external resource to use the external resource to perform the at least portion of the task, according to some embodiments.

FIG. 3 is a process flow diagram illustrating steps performed by a vehicle to request use of resources of other vehicles, roadside resources, or other electronic devices to perform at least a portion of a task for the vehicle, wherein the vehicle selects a given external resource to perform the at least portion of the task, and the vehicle establishes a wireless connection with the selected external resource to use the external resource to perform the at least portion of the task, according to some embodiments.

At block 302, a vehicle determines a task executing (or to be executed) in a runtime environment of the vehicle that is to be delegated, for at least partial execution, via a leased resource external to the runtime environment of the vehicle (e.g., at another vehicle, roadside resource, or electronic device). At block 304, the vehicle broadcasts a request for leased resources, for example as shown in FIG. 2, to one or more external resource providers within a geofence of the vehicle (e.g., other vehicles, roadside resources, or electronic devices). At block 306, the vehicle receives responses, for example as shown in FIG. 2, from the one or more external resource providers, wherein the responses include information about available resources and information about lease conditions for leasing the available resources. At block 308, the vehicle and the selected resource provider establish a connection to be used to perform the at least portion of the task. For example, a handshake may be performed to establish an ephemeral connection via various wired or wireless connection protocols, such as 5G, 4G, Wi-Fi, dedicated short-range communication (DSRC), PC5, etc. At block 310, the vehicle and the selected resource provider perform the task (or portion of a task) using the leased resources of the resource provider. In some embodiments, the established connection may be used to send the task to the leased resources, and depending on the task, the results may be provided back via the established connection. In some embodiments, the results may be forwarded on to another entity, such as a cloud-computing system, via a separate connection, or may be stored locally at the leased resource for later use.

Figure 4:
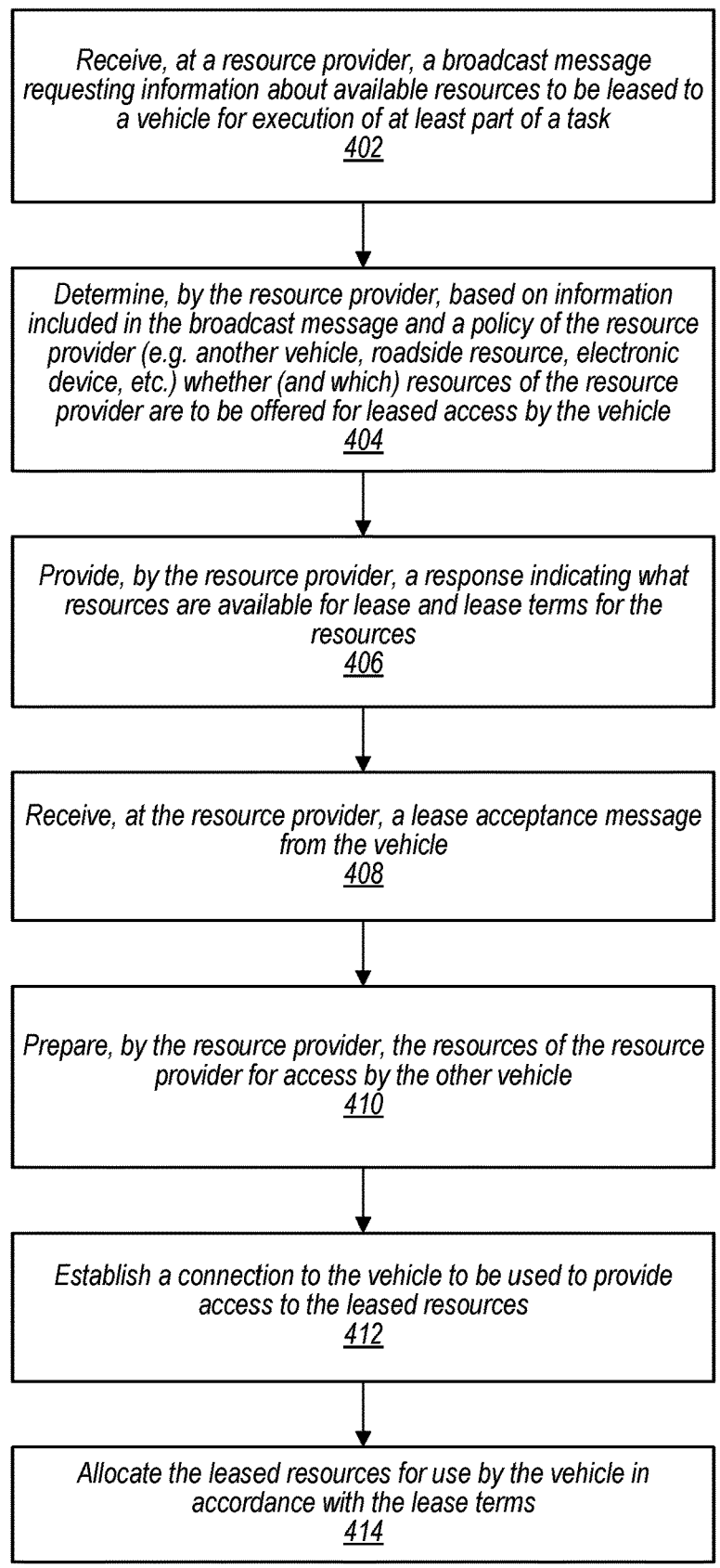
FIG. 4 is a process flow diagram illustrating steps performed at a resource provider (e.g., vehicle, roadside resource, other electronic device, etc.) to determine whether or not to offer a lease to a resource consumer (e.g., vehicle, roadside resource, other electronic device, etc.) to use resources of the resource provider to perform a task for the resource consumer, according to some embodiments.

FIG. 4 is a process flow diagram illustrating steps performed at a resource provider (e.g., vehicle, roadside resource, other electronic device, etc.) to determine whether or not to offer a lease to a resource consumer (e.g., vehicle, roadside resource, other electronic device, etc.) to use resources of the resource provider to perform a task for the resource consumer, according to some embodiments.

At block 402, a resource provider, such as a vehicle, roadside resource, electronic device, etc., receives a broadcast message requesting information about available resources to be leased to a vehicle for execution of at least part of a task. At block 404, the resource provider determines, based on information included in the broadcast message (such as information that identifies the requester, types of resources needed, amounts of time for which the resource are needed, a time window within which the resources are requested to be provided, etc.) and a policy of the resource provider, such as a resource sharing policy 140 or 164, whether (and which) resources of the resource provider are to be offered for leased access by the vehicle. At block 406 the resource provider provides a response, such as the responses 214, 216, 218, or 220 shown in FIG. 2, indicating what resources are available for lease and lease terms for the resources. At block 408, the resource provider receives a lease acceptance message from the vehicle that sent the broadcast message at 402 seeking to lease resources. At block 410, the resource provider prepares the resources of the resource provider that are to be leased to the vehicle for access by the vehicle. For example, a shared resource manager 172 may allocate a portion of the resources for lease by the vehicle. In some embodiments, this may include generated a containerized execution environment to be used to perform a delegated task using the leased resources. In some embodiments, this may include instantiating a virtualized computing device using the resources of the resource provider, wherein the shared resource manager provides virtualization management for the virtualized resource, and wherein the virtualized resource is made available to the vehicle to execute vehicle workloads as part of the lease. At block 412, a connection is established between the vehicle and the resource provider. Note that in some embodiments blocks 410 and 412 may be performed concurrently. Also, in some embodiments, the connection may be established at block 412 before the resource are prepared for lease at block 410. Next, at block 414, the leased resources are allocated for use by the vehicle, in accordance with the lease terms.

Figure 5:
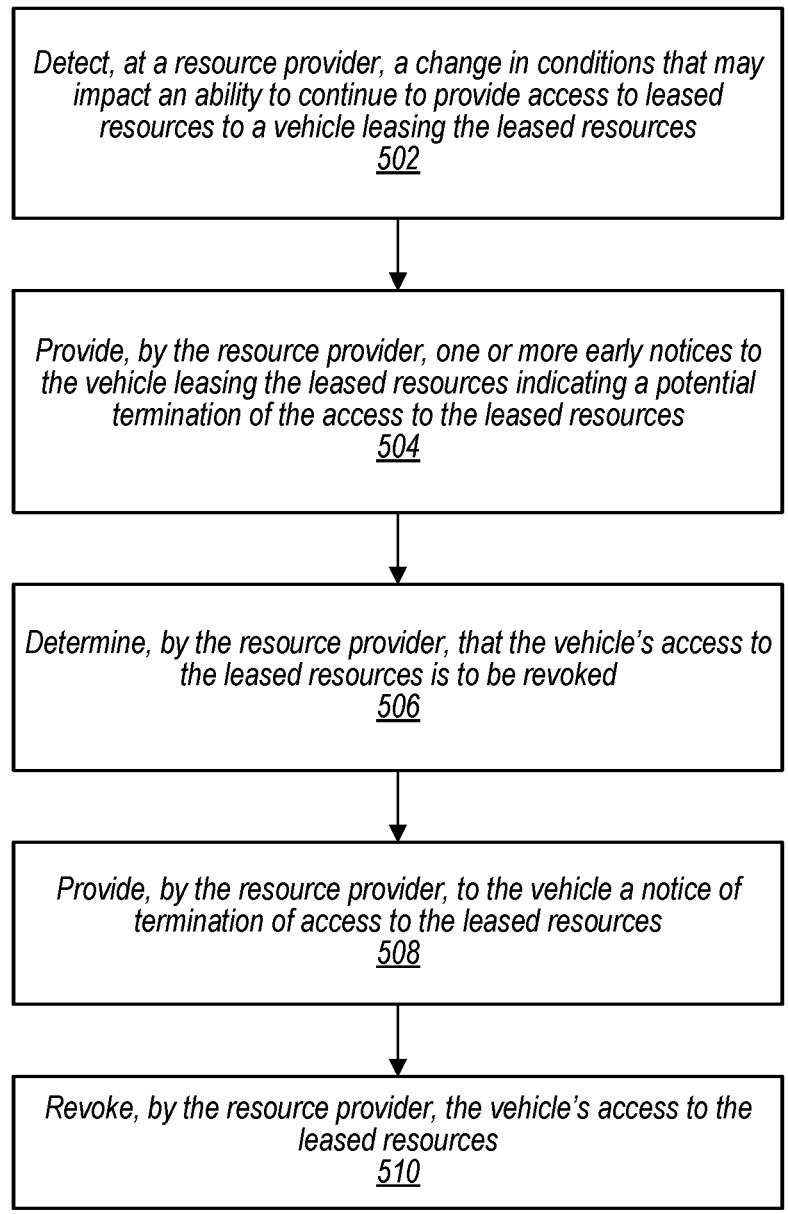
FIG. 5 is a process flow diagram illustrating steps performed at a resource provider to detect changing conditions and provide one or more notifications to a resource consumer regarding potential changes in availability of leased resources of the resource provider, according to some embodiments.

FIG. 5 is a process flow diagram illustrating steps performed at a resource provider to detect changing conditions and provide one or more notifications to a resource consumer regarding potential changes in availability of leased resources of the resource provider, according to some embodiments.

At block 502, the resource provider detects a change in conditions that may impact an ability to continue to provide access to leased resources to a vehicle leasing the leased resources, such as an indication that the resource provider may change locations (if in a static state), or may change routes (if in a moving state). The detection of the change in conditions may be inferred from various signals, such as a user unlocking the door, opening the door, starting the vehicle, updating a navigation route, etc. At block 504, the resource provider provides a resource consumer one or more early notices indicating the changed conditions and/or indicating an update time frame or time window during which the resource provider will be able to continue to provide resources to the resource consumer. At block 506, the conditions at the resource provider may have further changed such that the resource provider determines that the leased access to its resources is to be revoked. At block 508, the resource provider provides a resource consumer a notice of termination of access to the resources and at block 510 revokes the resource consumer's access to the leased resources.

Figure 6:
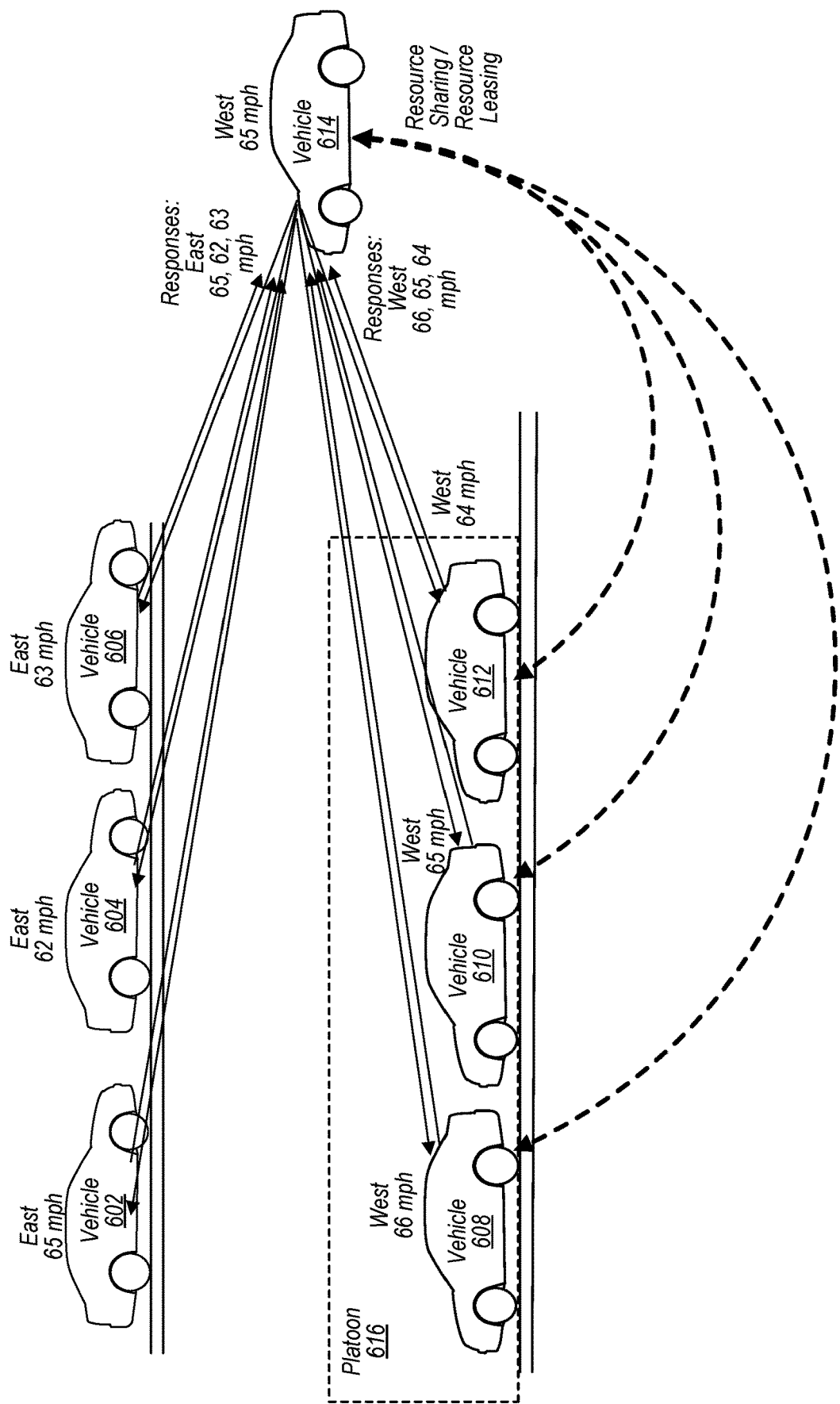
FIG. 6 illustrates a first vehicle negotiating a sharing of resources with a platoon of other vehicles travelling in a similar direction and speed as the first vehicle, according to some embodiments.

FIG. 6 illustrates a first vehicle negotiating a sharing of resources with a platoon of other vehicles travelling in a similar direction and speed as the first vehicle, according to some embodiments.

As mentioned above, in some embodiments, vehicles that move together may be considered to be part of a platoon. For example, vehicles 608, 610, and 612 that are traveling in the same direction and at about the same speed may be considered members of platoon 616. While vehicles 602, 604, and 606 travelling in a different direction may be members of a separate platoon, but are not members of platoon 616. In some embodiments, vehicle 714 may issue a broadcast for resources to vehicles 602, 604, 606, 608, 610, and 612. In some embodiments, the responses may indicate a direction of travel and speed of the respective vehicles. Additionally, or alternatively, the responses may indicate a platoon ID, such as a platoon ID for platoon 616. Vehicle 614 may select vehicles that are in a platoon that is moving in the same direction and speed as vehicle 614 to establish connections with to share resources.

In some embodiments, a particular vehicle, such as vehicle 612 may further allocate its resources to vehicle 614 to the exclusion of other potential lessees. In some embodiments, vehicle 612 as an example may decline to respond to further broadcast messages requesting leased resources while providing resources to vehicle 614. In some embodiments, other vehicles, such as vehicle 610, may virtualize resources and provide virtualized resources to multiple lessees at the same time. For example, while not shown, vehicle 610 may additionally lease resources to vehicle 608 that is also in its platoon, along with leasing resources to vehicle 614.

Figure 7:
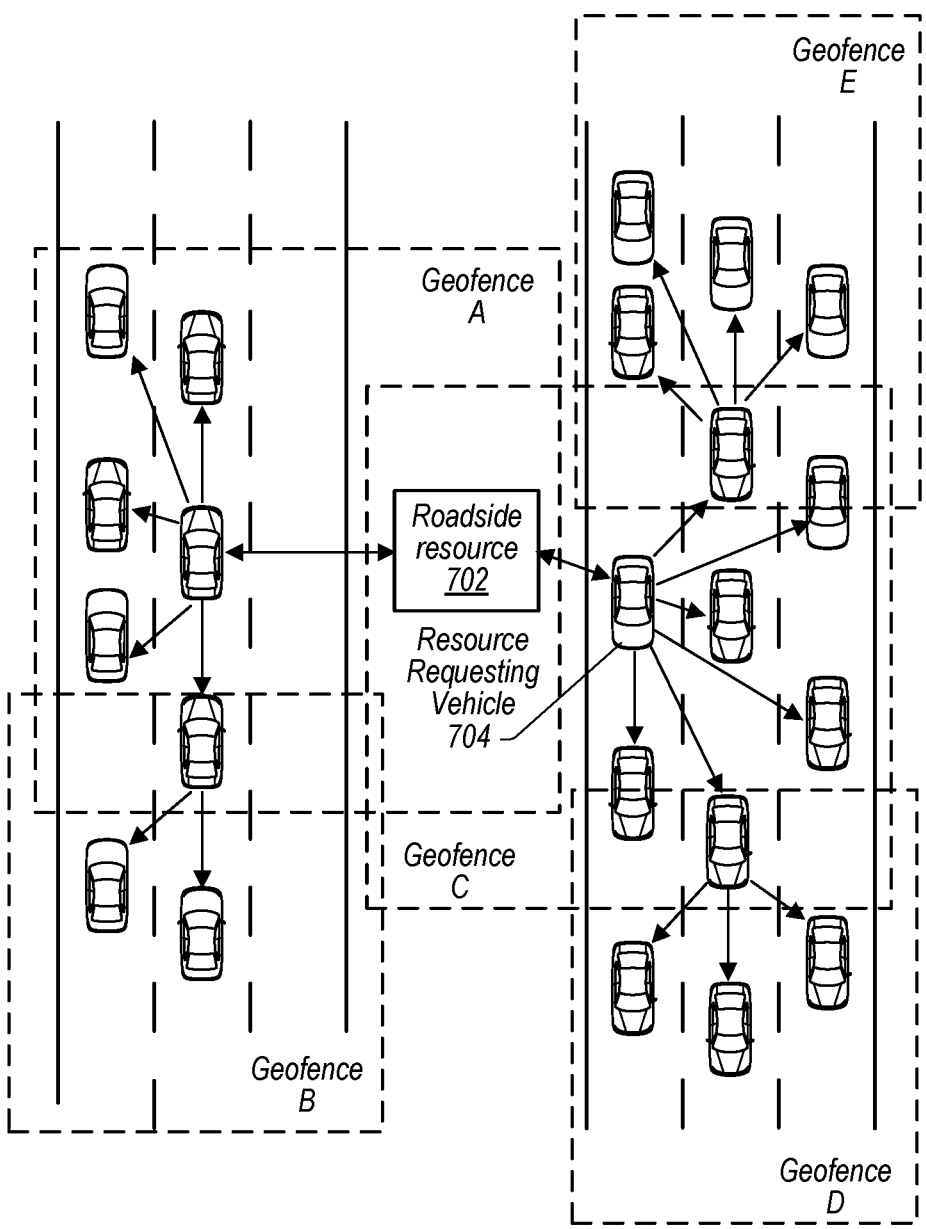
FIG. 7 illustrates a top view of a roadway wherein a roadside resource and vehicles in the roadway are included in overlapping geofences, according to some embodiments.

FIG. 7 illustrates a top view of a roadway wherein a roadside resource and vehicles in the roadway are included in overlapping geofences, according to some embodiments.

In some embodiments, a broadcast for available leased resources may be contained within a geofence of a vehicle issuing the broadcast, or may be propagated to other geofences. For example, in FIG. 7, vehicle 704 may issue a broadcast for leased resources that goes to other vehicles in geofence C, as well as roadside resource 702. The roadside resource may respond to the broadcast regarding local resources of the roadside resource that may be leased. Also, the roadside resource may propagate the request to other vehicles such as those in geofences A and B, that themselves may propagate to other vehicles. In a similar manner vehicles in geofence C may propagate the broadcast to vehicles in geofence D and E. For example, the vehicles in FIG. 7 may be in rush hour traffic and moving slowly, such that vehicle 704 may benefit from leasing resources from vehicles in other geofences, even if some of the vehicles in the other geofence are headed in an opposite direction.

In some embodiments, instead of defining platoons based on geofences as shown in FIG. 7, a platoon may be defined based on latency, e.g., vehicles with connections between each other with a latency less than a threshold value may be considered to be a platoon. Also, in some embodiments responses to vehicle 704 may indicate a latency of connection, and the vehicle 704 may select a resource provider based on latency.

Figure 8:
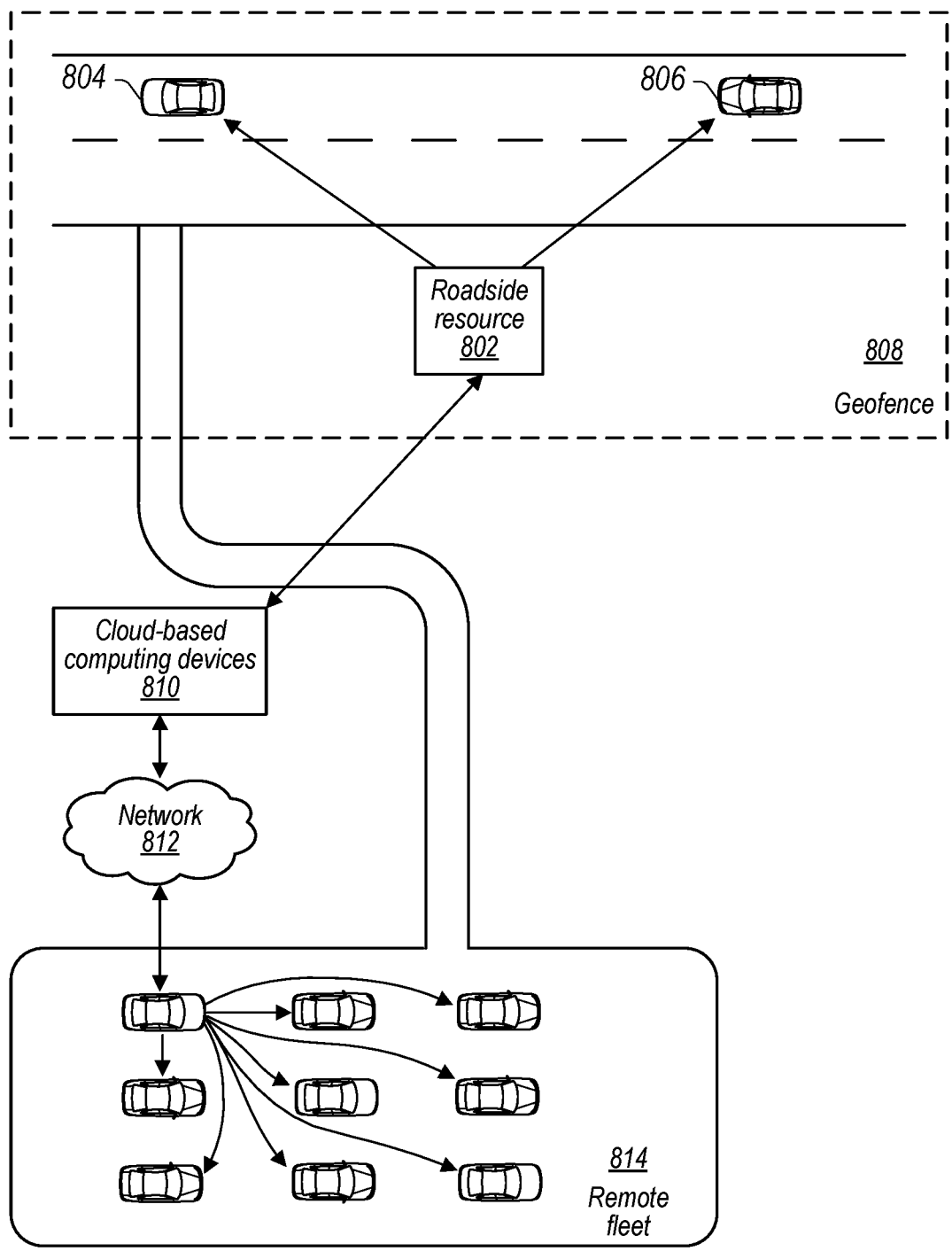
FIG. 8 illustrates a top view of a roadway and a remote location, wherein vehicles in the roadway are included in a geofence and vehicles at the remote location are included in a fleet, wherein the vehicles of the fleet are configured with policies that enable sharing of resources between members of the fleet, and wherein excess resources of the fleet may be leased for use by other vehicles via a connection to cloud-based computing devices, according to some embodiments.

FIG. 8 illustrates a top view of a roadway and a remote location, wherein vehicles in the roadway are included in a geofence and vehicles at the remote location are included in a fleet, wherein the vehicles of the fleet are configured with policies that enable sharing of resources between members of the fleet, and wherein excess resources of the fleet may be leased for use by other vehicles via a connection to cloud-based computing devices, according to some embodiments.

In some embodiments, a cloud-based computing device, such as cloud-based computing devices 810 may extend a range of available resource providers beyond a geofence in which a given vehicle seeking to lease resources is located. For example, cloud-based computing devices 810 may be connected to vehicles in remote fleet 814 via network 812 and may also be connected to roadside resource 802 and vehicles 804 and 8806 in geofence 808 with roadside resource 802. In some embodiments, a pool of available resource providers for vehicle 802 or 804 may be extended via the cloud to include the vehicles of remote fleet 814. In a similar manner, the cloud may be used to extend a pool of available resources that may be leased to vehicles of fleet 814 to include vehicles 804 and 806.

Figure 9:
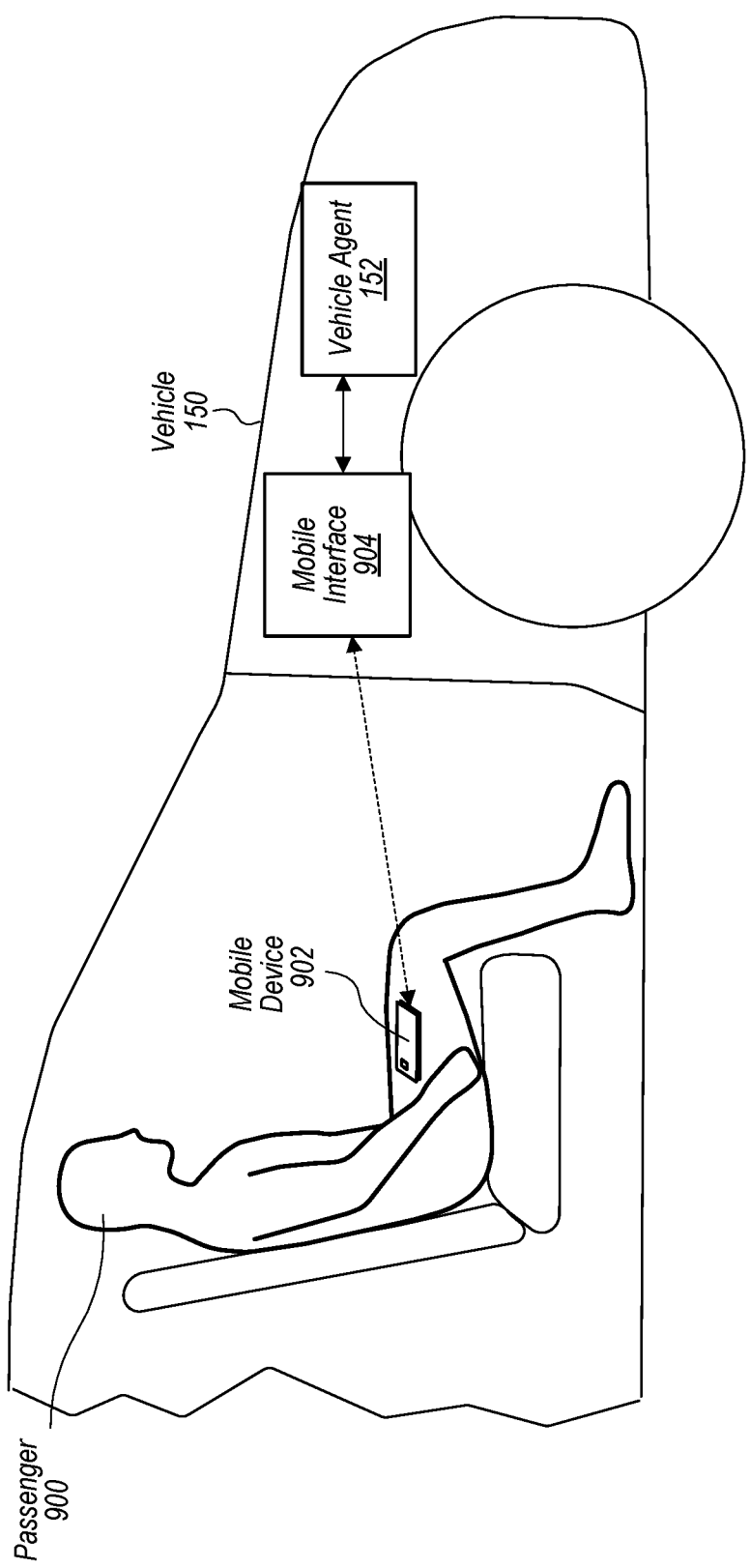
FIG. 9 illustrates the interior of a vehicle, wherein an external electronic device (external to a computer system of the vehicle) is used as an external resource that is leased to the vehicle to perform at least a portion of a task for the vehicle, according to some embodiments.

FIG. 9 illustrates the interior of a vehicle, wherein an external electronic device (external to a computer system of the vehicle) is used as an external resource that is leased to the vehicle to perform at least a portion of a task for the vehicle, according to some embodiments.

In some embodiments, a resource provider may be an electronic device carried within an interior of a vehicle. For example, in some embodiments, mobile device 902 carried by passenger 900 may be a resource provider to vehicle 150. In some embodiments a wired or wireless mobile interface 904 may connect the vehicle agent 154 to the mobile device 902. In some embodiments, various protocols may be used such as Bluetooth, a USB connection, etc.

Figure 10:
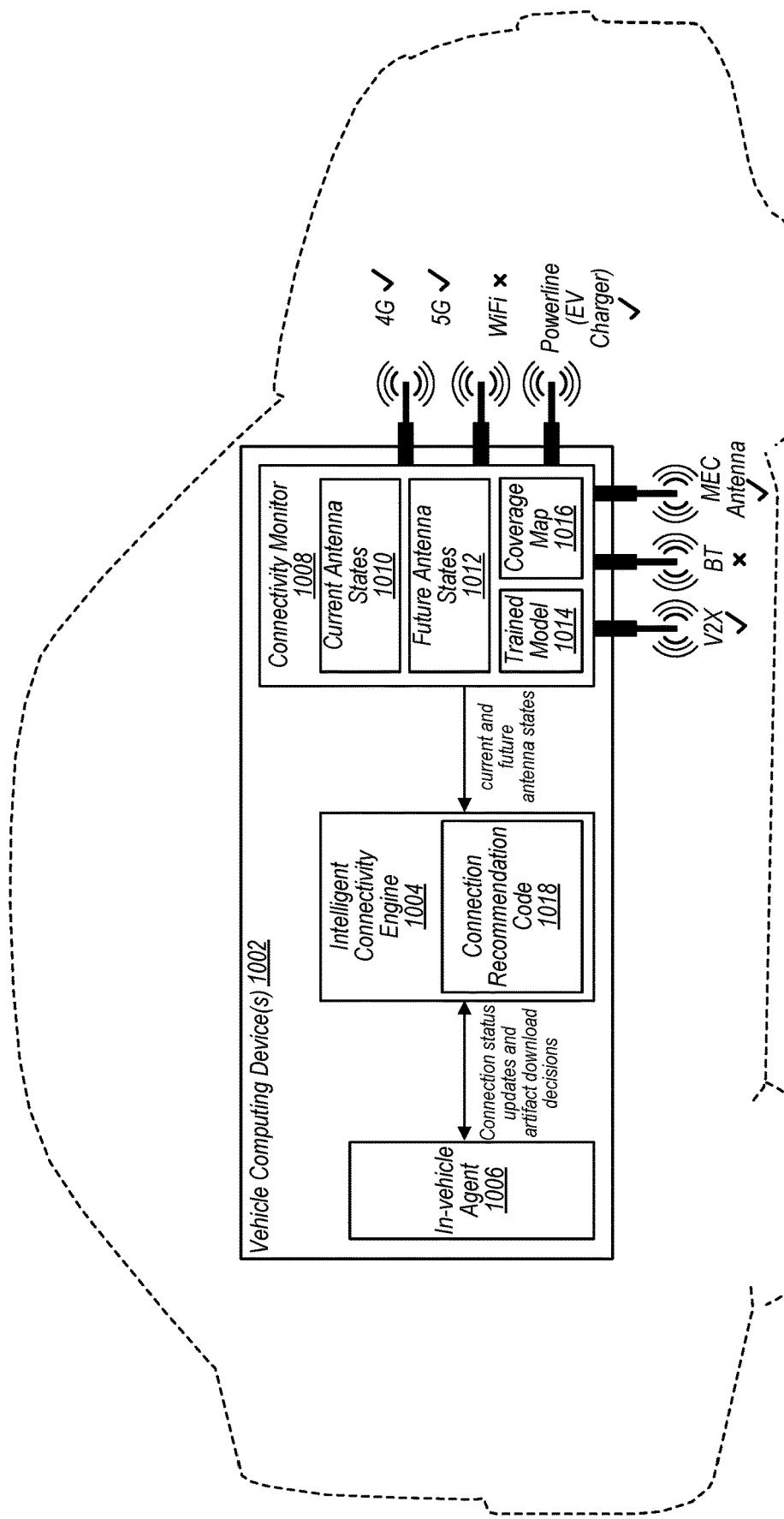
FIG. 10 is a logical diagram of a vehicle illustrating various types of antennas that may be included in the vehicle and also illustrating an intelligent connectivity engine that may determine which antenna to use for a given communication, according to some embodiments.

FIG. 10 is a logical diagram of a vehicle illustrating various types of antennas that may be included in the vehicle and also illustrating an intelligent connectivity engine that may determine which antenna to use for a given communication, according to some embodiments.

In the depicted example, one or more computing devices 1002 implement an intelligent connectivity engine 1004, an in-vehicle agent 1006, and a connectivity monitor 1008. In various embodiments, the intelligent connectivity engine, in-vehicle agent, and connectivity monitor may be implemented/distributed across any number of computing devices of the vehicle.

In some embodiments, the intelligent connectivity engine, in-vehicle agent, and connectivity monitor may be implemented within a particular computing device (e.g., within a hardware module). In an embodiment, the hardware module may be initially configured at a manufacturer site or service provider site and shipped to a client for installation at the client's site (e.g., at a vehicle assembly line). In some embodiments, some or all of the intelligent connectivity engine, in-vehicle agent, and/or connectivity monitor may be downloaded from a service provider's remote provider network (e.g., at the client's site or after the vehicle is purchased/used by a customer).

The connectivity monitor 1008 may monitor/store the current antenna states 1010 and/or the future antenna states 1012 for any number of different antennas (or wired interfaces) of the vehicle that may each transmit/receive radio signals according to a different radio protocol (or according to different wired protocols in the case of wired interfaces). In the depicted example, the antennas include a vehicle-to-vehicle antenna (V2X), a Bluetooth antenna (BT), an antenna for connecting with cellular enabled edge compute infrastructure (e.g., a mobile edge compute (MEC) antenna), a 4G antenna, a 5G antenna, a Wi-Fi antenna, and a powerline wired interface (e.g., for use with an electric vehicle charger).

The connectivity monitor 1008 may also include one or more trained models 1014. A trained model may be trained to use inputs based on a current state of a connectivity options, a current location of the vehicle, a local coverage map, an expected future location of the vehicle (which may itself be determined from a trained model), and/or any other number of inputs and output a predicted future state of the connectivity option (e.g., at one or more points in time in the future and/or during one or more future time windows) based on the current state and/or other inputs. For example, the model may output a prediction that the 5G antenna will be available with maximum bandwidth capability (or available with at least a certain level of bandwidth capability) starting in 10 minutes because the predicted location of the car in 10 minutes will be at the beginning of a 5G coverage area with a strong 5G signal. In embodiments, one or more trained models may predict where a vehicle will be at any point(s) in time in the future based on any number of inputs.

In embodiments, a future location may be predicted by a model based on any number of inputs such as a current GPS (global positioning system) location, a current/planned route that the vehicle is following, and or any other inputs, such as a predicted travel speed along one or more locations or portions of the route based on current traffic congestion/conditions and/or predicted traffic congestion/conditions along the one or more locations or portions of the route. Another example of an input that may be used to predict a future location of the vehicle is location history. For example, the vehicle may have been driven to work along a specific route on a particular day of the week (e.g., Friday) or the vehicle may have been driven along a longer and/or different route when traffic was heavy along a more frequently used route. If it is Friday, then the model may use the specific route when predicting the future vehicle location. If there is traffic along the more frequently used route, then the model may use the longer and/or different route when predicting the future vehicle location. The connectivity monitor 1008 may also include a coverage map 1016, which may indicate a coverage area for one or more radio protocols used by the vehicle (e.g., for some or all of the antennas).

In embodiments, the connectivity monitor 1008 may determine a current state and/or predicted future state of respective connectivity options of a plurality of connectivity options of the vehicle (e.g., multiple different antennas). As depicted, different connectivity options may be configured to communicate according to different radio protocols. The connectivity monitor 1008 may then send to the intelligent connectivity engine 1004 the current state and/or future state of the respective connectivity options.

Note that in embodiments, any of the techniques discussed herein for antennas (e.g., wireless communication interfaces) may also apply to any number of wired communications interfaces, such as the powerline interface of the depicted example. For example, some workloads may have criteria that specify the workload is required to use the powerline (or other type of wired communications interface) in order to transmit and/or receive data and those workloads may be assigned for current or future execution, based at least on the current and/or predicted state of the powerline.

The intelligent connectivity engine 1004 may receive the current state and/or future state of the respective connectivity options as well as prioritization information for the artifact (determined based on the vehicle-to-vehicle distribution policy for the artifact). Based at least on the current state and/or future state of the respective connectivity options and based on the prioritization of the artifact, the intelligent connectivity engine may assign at least one artifact for current retrieval and at least another artifact for future retrieval.

In some embodiments, to determine the future state of a particular antenna, the connectivity monitor (or intelligent connectivity engine) may determine the future state for the particular antenna based at least on one or more of a planned route for the vehicle, a coverage map 1016 for a radio protocol used by the antenna, and/or one or more environmental conditions for at least a portion of the planned route. For example, the intelligent connectivity engine may determine that, at the current vehicle speed and based on the planned route and coverage map, the future state of the particular antenna will be much higher bandwidth capability starting in 10 minutes (e.g., an upcoming strong signal area on the coverage map).

As another example, the intelligent connectivity engine may determine that, at the current vehicle speed and based on the planned route and environmental conditions at an upcoming portion of the route, the future state will be much lower bandwidth capability for the particular antenna starting in 10 minutes (e.g., storm clouds that reduce bandwidth of a satellite antenna). In various embodiments, an intelligent connectivity engine and/or connectivity monitor may predict a future state of a connectivity option at any particular time in the future with or without the use of a trained model.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors.

The program instructions may implement the functionality described herein (e.g., the functionality of the vehicle software and/or distributed control plane, the in-vehicle agent, the intelligent connectivity engine, the connectivity monitor, the roadside resource and any other components described herein). The various methods as illustrated in the figures and described herein represent example embodiments of methods. The order of any method may be changed, and various elements may be added, reordered, combined, omitted, modified, etc.

Figure 11:
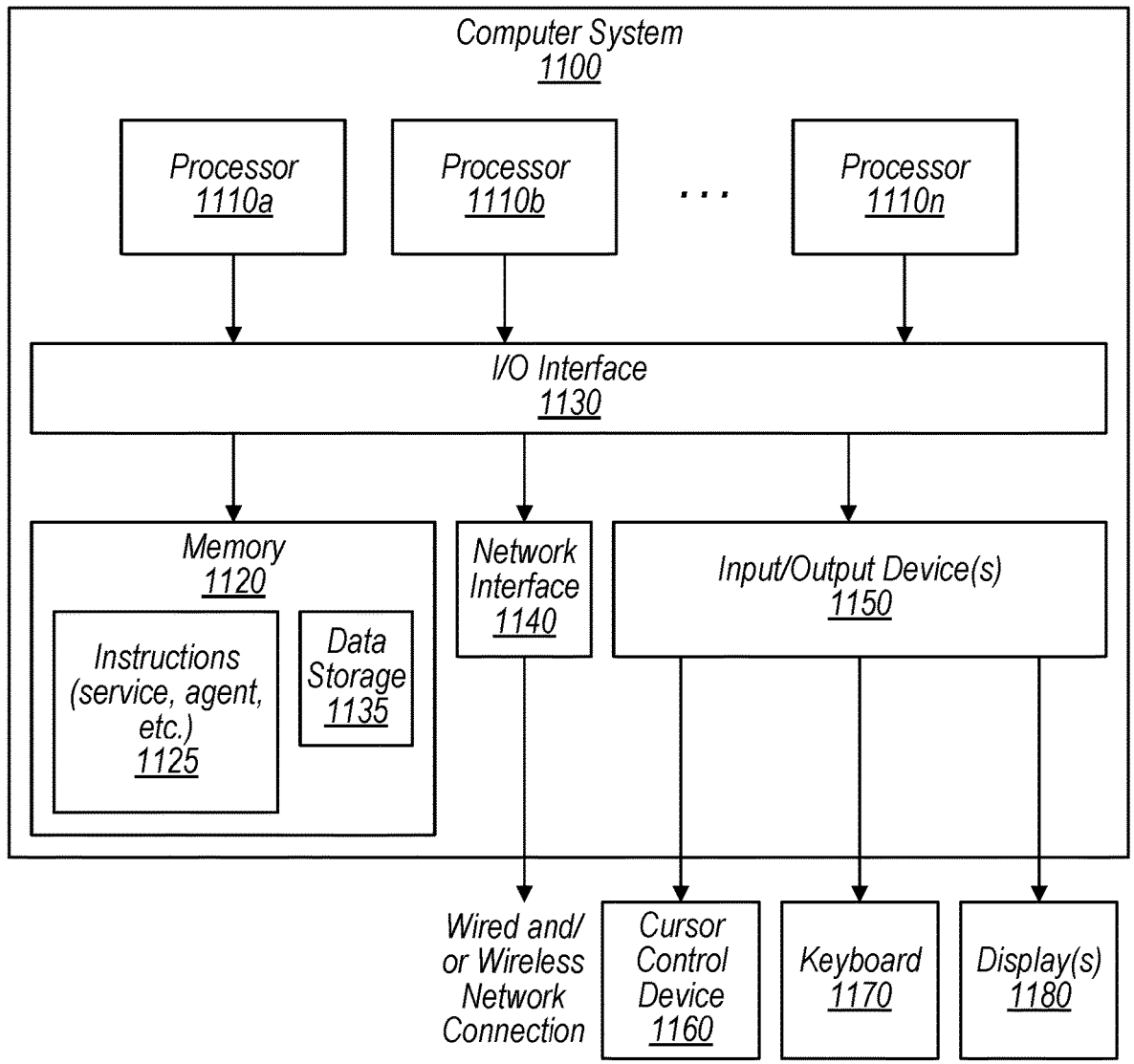
FIG. 11 is a block diagram illustrating an example computing system, according to some embodiments.

Embodiments implement vehicle software and/or resource sharing using direct vehicle-to-vehicle communications, which may be implemented using one or more of various systems or devices. One such computer system is illustrated by FIG. 11. In different embodiments, computer system 1100 may be any of various types of devices, including, but not limited to an application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a computer or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above (e.g., the vehicle software and/or distributed control plane, the in-vehicle agent, and any other components, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125 that implement the various embodiments of the systems as described herein, and data store 1135, comprising various data accessible by program instructions 1125, in one embodiment. In one embodiment, program instructions 1125 may include software elements of embodiments as described herein and as illustrated in the figures. Data storage 1135 may include data that may be used in embodiments (e.g., distributed control plane instructions, vehicle resource sharing policies, vehicle task delegation policies, information sharing policies, state of antenna or other connectivity option, coverage map, model, policy code, configuration data, data, metadata, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more cloud computing devices, configured to:
   generate a vehicle agent configured to be executed in a vehicle runtime environment of a vehicle, wherein the vehicle agent, when executed in the vehicle runtime environment, is further configured to:
   cause a broadcast to be issued via an antenna of the vehicle to one or more resource providers external to the vehicle;
   receive one or more responses from the one or more resource providers indicating an availability of resources at respective ones of the one or more resource providers to execute at least part of a task of the vehicle, wherein based on the one or more responses and a policy of the vehicle agent, a set of one or more resources of the one or more resource providers is used to execute the at least part of the task, and wherein the set of one or more resource providers is further based on an execution duration of the task and an estimated amount of time a location, or a travel direction and/or speed, of the one or more resource providers will remain within a threshold tolerance for a threshold duration during the execution of the at least part of the task;
   establish a connection to the set of one or more resources of the one or more resource providers via the antenna of the vehicle; and
   execute the at least part of the task at least in part using leased resources of the set of one or more resources of the one or more resource providers.

2. The system of claim 1, wherein the one or more resource providers external to the vehicle comprise one or more of:
   another vehicle located in a geofence with the vehicle;
   a roadside resource located in a geofence with the vehicle; or
   an electronic device of a passenger of the vehicle.

3. The system of claim 1, wherein the leased resources of the set of one or more resources of the one or more resource providers comprise one or more of:
   leased computing resources;
   leased storage resources; or
   leased networking resources.

4. The system of claim 1, wherein the one or more cloud computing devices are further configured to generate another vehicle agent configured to be executed in another vehicle runtime environment of another vehicle, wherein the other vehicle is one of the one or more resource providers that receive the broadcast from the vehicle, and
- wherein the other vehicle agent, when executed in the other vehicle runtime environment, is configured to:
  - receive, via an antenna of the other vehicle, a request from the vehicle for leased access to one or more resources of the other vehicle, wherein one or more resources of the other vehicle are offered for leased access to the vehicle based on information included in the request and a policy of the other vehicle;
  - provide, in response to the one or more resources of the other vehicle being offered for leased access to the vehicle, a response to the vehicle indicating the one or more resources offered for lease and one or more lease terms for the one or more resources offered for lease; and
- responsive to receiving a lease acceptance from the vehicle, initiate one or more configuration operations to make the one or more resources of the other vehicle available to execute the at least part of the task for the vehicle.

5. The system of claim 4, wherein the one or more resources of the other vehicle made available to execute the at least part of the task for the vehicle are made available in a containerized execution environment.

6. The system of claim 4, wherein the one or more resources of the other vehicle made available to execute the at least part of the task for the vehicle are made available as virtualized resources managed by a virtualization manager implemented at the other vehicle.

7. The system of claim 4, wherein the policy of the other vehicle enables sharing of resources between vehicles of a fleet, wherein the vehicle and the other vehicle are members of the fleet.

8. The system of claim 4, wherein the policy of the other vehicle enables sharing of resources with non-fleet third-party vehicles via a lease negotiation process.

9. The system of claim 1, wherein the broadcast is additionally sent to the one or more cloud-computing devices, wherein the one or more cloud-computing devices are configured to:
- wherein the set of resource providers used to execute the at least part of the task includes at least one resource provider outside of a range of the antenna of the vehicle,
- wherein the response includes the at least one resource provider outside of the range of the antenna of the vehicle, and
- wherein the connection established to the set of the one or more resource providers via the antenna of the vehicle is further established via the one or more cloud-based computing devices.

10. One or more non-transitory, computer-readable, storage media, storing program instructions that, when executed on or across one or more processors, cause the one or more processors to:
- cause a broadcast to be issued from the vehicle to one or more resource providers external to the vehicle requesting access to use one or more resources of the one or more resource providers to execute, at least in part, a task of the vehicle;
- receive one or more responses from the one or more resource providers indicating an availability of resources at the one or more resource providers to execute the at least part of the task, wherein based on the one or more responses and a policy of the vehicle, a set of the one or more resource providers is used to execute the at least part of the task, and wherein the set of one or more resource providers is further based on an execution duration of the task and an estimated amount of time a location, or a travel direction and/or speed, of the resource providers will remain within a threshold tolerance for a threshold duration during the execution of the at least part of the task;
- cause a connection to be established between the vehicle and the set of the one or more resource providers external to the vehicle; and
- execute the task, at least in part, using one or more resources of the set of one or more resource providers that are external to the vehicle.

11. The one or more non-transitory, computer-readable, storage media of claim 10, wherein the one or more responses from the one or more resource providers further comprise location information and travel direction and/or speed information for the one or more resource providers, and
- wherein the set of the one or more resource providers are further based at least in part on the location information and the travel direction and/or speed information such that the set of one or more resource providers are travelling in a platoon with the vehicle.

12. The one or more non-transitory, computer-readable, storage media of claim 10, wherein the responses from the one or more resource providers further comprise the estimated amount of time for which the location or the travel direction and/or speed of the one or more resource providers will remain constant within the threshold tolerance.

13. The one or more non-transitory, computer-readable, storage media of claim 10, wherein the responses from the one or more resource providers further comprise a cryptographic signature indicating one or more entities associated with the one or more resource providers, and
- wherein the set of one or more resource providers are further based on sharing rules included in the policy with regard to the one or more entities associated with the one or more resource providers.

14. The one or more non-transitory, computer-readable, storage media of claim 13, wherein the one or more rules stipulate entities allowed, or not allowed, to process tasks that include personally identifiable information (PI).

15. The one or more non-transitory, computer-readable, storage media of claim 10, wherein the one or more resource providers, comprise one or more of:
- another vehicle located in a geofence with the vehicle;
- a roadside resource located in a geofence with the vehicle; or
- an electronic device of a passenger of the vehicle.

16. The one or more non-transitory, computer-readable, storage media of claim 10, wherein the one or more resources of the set of the one or more resource providers comprise one or more of:
- computing resources;
- storage resources; or
- networking resources.

17. One or more non-transitory, computer-readable storage media, storing program instructions that, when executed on or across one or more processors, cause the one or more processors to:
- receive, at a first vehicle, a request from a second vehicle for access to one or more resources of the first vehicle wherein based on information included in the request and a policy of the first vehicle, one or more resources of the first vehicle are offered for leased access to the second vehicle, and wherein the information included in the request comprises an execution duration of a task of the second vehicle and an estimated amount of time which a travel direction and/or speed of the first vehicle will remain within a threshold tolerance for a threshold duration during execution of the task;

provide, in response to offering the second vehicle leased access to the one or more resources of the first vehicle, a response to the request indicating the one or more resources of the first vehicle offered for lease and one or more lease terms for the one or more resources of the first vehicle to be leased for use by the second vehicle; and responsive to receiving a lease acceptance from the second vehicle, initiate one or more configuration operations to execute at least a portion of the task for the second vehicle using the one or more resources of the first vehicle.

18. The one or more non-transitory, computer-readable, storage media of claim 17, wherein the first vehicle and the second vehicle each comprise a vehicle agent with control plane application programmatic interfaces (APIs) configured to receive the request and the response to negotiate the leased access.

19. The one or more non-transitory, computer-readable, storage media of claim 17, wherein the one or more resources of the first vehicle are made available to execute the at least portion of the task for the second vehicle via implementation of a software container that enables containerized execution of program instructions that execute the at least portion of the task.

20. The one or more non-transitory, computer-readable, storage media of claim 17, wherein the one or more resources of the first vehicle made available to execute the at least a portion of the task for the second vehicle comprise one or more of:
   computing resources;
   storage resources; or
   networking resources.

\* \* \* \* \*